(12) United States Patent
Bahnsen et al.

(10) Patent No.: US 9,686,364 B2
(45) Date of Patent: Jun. 20, 2017

(54) LOCATION AWARE RESOURCE LOCATOR

(75) Inventors: Robert Bruce Bahnsen, Boulder, CO (US); Mallik Bulusu, Bellevue, WA (US); Vincent J. Zimmer, Tacoma, WA (US); Robert S. Gittins, Divide, CO (US); Robert Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/992,393

(22) PCT Filed: Dec. 21, 2011

(86) PCT No.: PCT/US2011/066561
§ 371 (c)(1),
(2), (4) Date: Nov. 12, 2014

(87) PCT Pub. No.: WO2013/095450
PCT Pub. Date: Jun. 27, 2013

(65) Prior Publication Data
US 2015/0067163 A1 Mar. 5, 2015

(51) Int. Cl.
*H04W 64/00* (2009.01)
*H04L 29/08* (2006.01)
(Continued)

(52) U.S. Cl.
CPC ............... *H04L 67/18* (2013.01); *G01S 5/02* (2013.01); *H04L 47/70* (2013.01); *H04W 4/02* (2013.01); *H04W 64/003* (2013.01)

(58) Field of Classification Search
CPC ...... H04W 4/02; H04W 64/003; H04L 67/18; H04L 47/70; G01S 5/02
See application file for complete search history.

(56) References Cited

U.S. PATENT DOCUMENTS

| 8,265,871 B1 * | 9/2012 | Starns | G06F 17/3087 455/456.3 |
| 2003/0065710 A1 | 4/2003 | Oakeson et al. | |

(Continued)

FOREIGN PATENT DOCUMENTS

| CN | 101513114 A | 8/2009 |
| CN | 102172093 A | 8/2011 |

(Continued)

OTHER PUBLICATIONS

"International Application Serial No. PCT/US2011/066561, International Preliminary Report on Patentability mailed Jul. 3, 2014", 7 pgs.

(Continued)

*Primary Examiner* — Oanh Duong
(74) *Attorney, Agent, or Firm* — Schwegman Lundberg & Woessner, P.A.

(57) ABSTRACT

Systems and methods providing a location-aware resource locator model for facilitating communication with networked electronic devices are generally disclosed herein. One embodiment includes a resource locator using a standard Uniform Resource Locator (URL) format, but enabling identification of one or more devices based on logical location information provided in the resource locator. The resource locator may also enable identification of the one or more devices based on logical proximity information (such as a logical term indicating a location property) relative to a dynamic location. Further disclosed embodiments include uses of a hierarchical structure to define logical terms and classes for use with a resource locator, and various location determination and lookup techniques used in connection with accessing an electronic device.

23 Claims, 5 Drawing Sheets

(51) Int. Cl.
*H04W 4/02* (2009.01)
*G01S 5/02* (2010.01)
*H04L 12/911* (2013.01)

(56) References Cited

U.S. PATENT DOCUMENTS

| | | |
|---|---|---|
| 2003/0073412 A1 | 4/2003 | Meade, II |
| 2004/0215816 A1 | 10/2004 | Hayes et al. |
| 2006/0039348 A1* | 2/2006 | Racz ............... H04L 29/12009 370/351 |
| 2010/0040029 A1 | 2/2010 | Doppler et al. |
| 2011/0207429 A1* | 8/2011 | Maier ................. H04W 64/00 455/404.2 |

FOREIGN PATENT DOCUMENTS

| | | |
|---|---|---|
| JP | 2008033043 A | 2/2008 |
| JP | 2008187597 A | 8/2008 |
| TW | 201342954 A | 10/2013 |
| WO | WO-2006096824 A2 | 9/2006 |
| WO | WO-2013095450 A1 | 6/2013 |

OTHER PUBLICATIONS

"Taiwanese Application Serial No. 101147197, Office Action mailed Jul. 24, 2014", w/English Translation, 69 pgs.

"Application Serial No. PCT/US2011/066561, Written Opinion mailed Sep. 7, 2012", 5 pgs.

"International Application Serial No. PCT/US2011/066561, Search Report mailed Sep. 7, 2012", 3 pgs.

"European Application Serial No. 11878216.8, Extended European Search Report mailed Apr. 30, 2015", 8 pgs.

"European Application Serial No. 11878216.8, Response filed Nov. 30, 2015 to Extended European Search Report mailed Apr. 30, 2015", 18 pgs.

"Japanese Application Serial No. 2014-545876, Office Action mailed Jul. 7, 2015", 15 pgs.

"Japanese Application Serial No. 2014-545876, Resoponse filed Oct. 5, 2015 to Office Action mailed Jul. 7, 2015", 18 pgs.

\* cited by examiner

LOCATION AWARE RESOURCE LOCATOR

PRIORITY APPLICATION

This application is a U.S. National Stage Application under 35 U.S.C. 371 from International Application No. PCT/US2011/066561, filed Dec. 21, 2011, which is hereby incorporated by reference in its entirety.

TECHNICAL FIELD

Embodiments pertain to the use of network-connected devices and software applications. Some embodiments relate to network addressing configurations and resource locators used in connection with such devices and applications.

BACKGROUND

Networked electronic devices, including interconnected devices and sensors, are increasingly deployed in a variety of forms and configurations. These devices are becoming fundamental to the everyday actions of consumers, students, medicine, and business enterprise users, and are becoming used in virtually every aspect of activity including commerce, transportation, entertainment, and the like.

One of the fundamental building blocks of internet communications is the Universal Resource Locator (URL), generally structured in the format of "scheme://domain:port". The use of URLs has served well for the client-server model familiar to today's current world wide web of documents. This configuration, however, is not directly applicable to various private network configurations and the uses of many networked electronic devices. Communication and addressing issues of networked electronic devices are often solved in an ad hoc way that is not standards-based.

DETAILED DESCRIPTION

Figure 1:
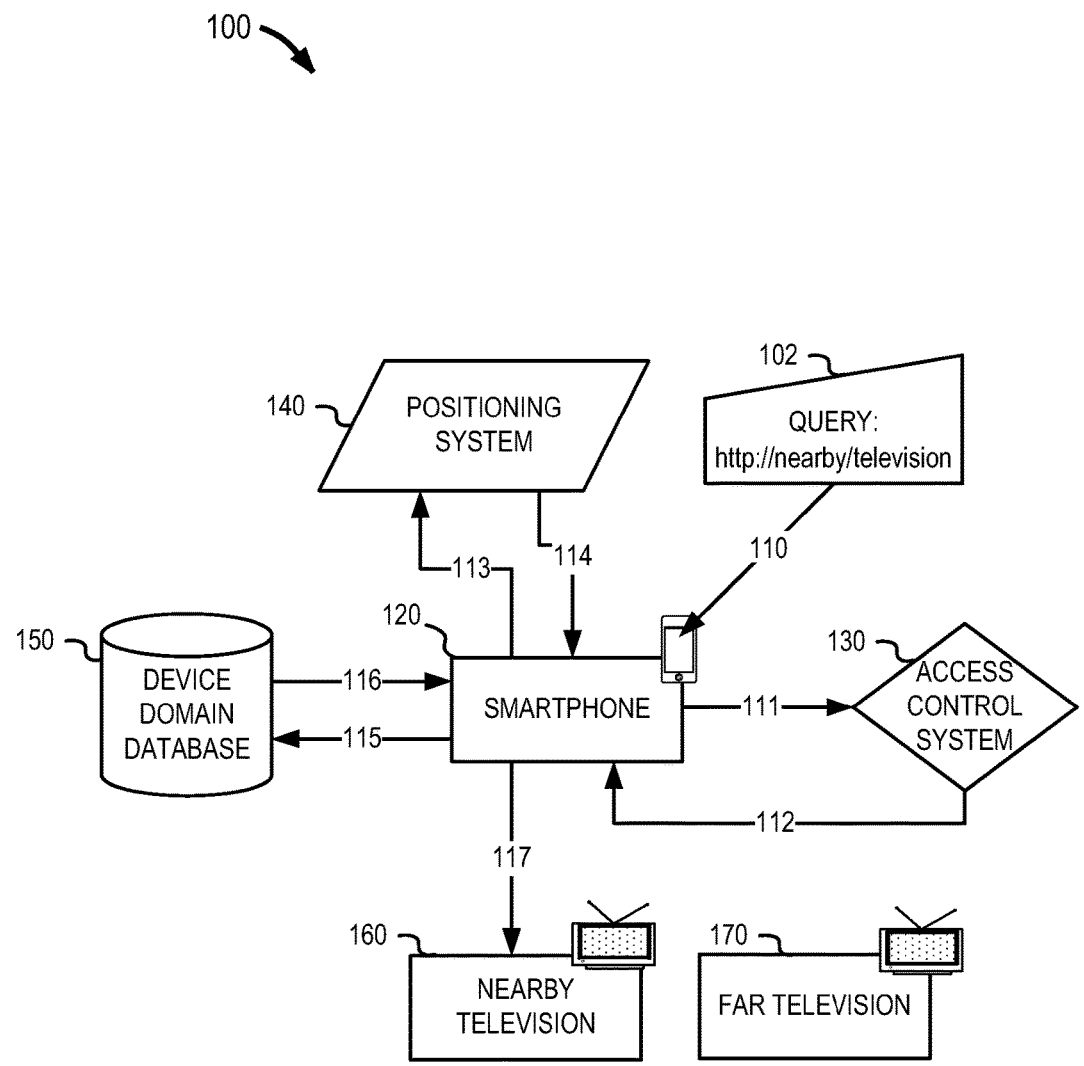
FIG. 1 provides an illustration of a system architecture enabling an interaction with electronic devices using a location-aware resource locator according to an example embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present disclosure provides techniques and configurations to enable resource locator usage with various networked electronic devices. In particular, the presently described resource locator model enables an open way of seamlessly addressing a variety of devices using ad hoc queries containing intuitive constraints. Further, this resource locator model does not rely on the use of previously defined fixed-location strings, as used with a typical URL scheme.

Use of the presently described resource locator model, further referred to in the following disclosure as a "location-aware resource locator", provides a fundamental infrastructure for device networks to communicate and be accessed by users, other devices, and systems. This location-aware resource locator configuration further enhances the possible use cases for networked electronic devices that utilize dynamic information to be located and communicated with. For example, the location-aware resource locator may be configured to factor location mobility of either or both of the contacted and contacting devices.

Numerous of the following embodiments and examples describe a location-aware resource locator model used in conjunction with location determination systems and device tracking information. As will be apparent, use of a location-aware resource locator and such accompanying systems may form a core infrastructure for communicating with a wide variety of devices and systems in a disparate network of "things". Therefore, the location-aware resource locator model described herein is applicable to various sensor and control networks, and similar use models where generic classes of devices are identified in the physical world based on proximity.

In one example embodiment, a location-aware resource locator extends standard URL syntax in a form that can indicate location as well as a device type or class. The form of this location-aware resource locator may be structured to conform to: "scheme://{domain or proximity class}/{properties}". A domain may be, for example, "jones.house" or "ACME.office". A proximity class may include various proximity criterion terms, such as "near", "within_100_meters", or "current_room".

In a further embodiment, the properties specified in the location-aware resource locator may serve a similar function as a query string, for example by returning a list of devices or device data matching the properties specified in the resource locator. Thus, the presently described location-aware resource locator may be configured to access not only a particular dynamically-located resource, but may also obtain information on groups of dynamically located resources. In contrast, a Domain Name System (DNS) name mapping is a 1:1 mapping of a host and domain name to an IP address, and a URL used in connection with a web server is generally configured to return exactly zero or one document.

The network architecture for interpreting values provided in a location-aware resource locator may be implemented within a name server, a network domain controller, a server, a client, or a variety of hardware devices and systems. For example, a mobile device configured to directly interpret an input location-aware resource locator may parse the relevant properties from the resource locator, and perform various lookup operations to determine which device (or group of devices) matches the provided values. These lookup operations, including a location lookup for a device in a hierarchy of located devices, are further detailed in the following examples.

FIG. 1 provides an illustration of a network architecture 100 configured according to an example embodiment, supporting the use of a location-aware resource locator from a smartphone device 120. As illustrated, the smartphone 120 is attempting to locate a HTTP service of a nearby television, such as with the use of a query 102 providing the location-aware resource locator "http://nearby/television".

This location-aware resource locator is interpreted by the smartphone 120 to include a specific request to locate and interact with a device (a television) having a certain location proximity (being most near to the smartphone). Because the smartphone 120 and the television most near to the smartphone 120 may be located in any number of physical or network locations, a series of processing actions occur to parse and process the resource locator. These processing actions include determining where the smartphone 120 is located, determining which devices satisfy a "television" property, determining the nearest television based on the physical location of the televisions and the smartphone 120, and contacting or providing contact information for the nearest television (the nearby television 160).

In the illustrated embodiment, smartphone 120 first connects to an access control system 130 to verify access for identification or control of the nearby television. The access control system 130, for example, may be used to only allow verified or authenticated users to identify and access certain devices. A robust security authentication may be desired for control of devices such as security cameras connected to a network. For the control of some devices, for example the use of lighting devices in a private home setting, robust security authentication may not be desired. Thus, the access control system 130 may allow use of the certain devices or device types with reduced authentication requirements or device communication restrictions.

The query 102 which provides a resource locator string is interpreted by the smartphone 120 to provide both location ("near") and device ("television") specific attributes. The physical location of the television is generally fixed and can be predetermined, but the physical location of the smartphone is dynamic and will need to be determined when evaluating the resource locator. As shown, the location coordinates of the smartphone 120 may be provided by a positioning system 140. For example, the positioning system 140 may include use of Global Positioning System (GPS) to obtain absolute geographic coordinates, or use of a building-level positioning system to obtain more narrowly focused coordinates within a building or defined environment.

A request to obtain identification of the specific device, in this case the television most near to the user, may be located from a listing of potential devices which includes nearby television 160 and far television 170. The device domain database 150 may be configured to provide listings of devices in one or more domains, which may be a home, office, or other defined environment. For example, a user may access the device domain database 150 to obtain a full list of devices within a domain or sub domain, or devices selected based on some proximity criterion; likewise a user may access the device domain database 150 to obtain only a limited listing (or a listing of only one item) satisfying some property specified in the resource locator.

As illustrated, smartphone 120 connects to device domain database 150 to obtain information for one or more television devices, and relevant information (such as locations, identifiers, and connectivity information) for communication with the one or more television devices. In the example of FIG. 1, this may be provided in the form of a list of television devices in the entire domain, including nearby television 160 and far television 170. The smartphone 120 can then process this list, and filter down the listing of televisions by location to the most near television. The most near television can be determined by comparing the locations of the televisions previously stored in the device domain database 150, with the location of the smartphone determined from the positioning system 140.

After locating the nearby television 160 as the most near television, the smartphone can then use connectivity information obtained from device domain database 150 to connect to the nearby television 160. The connectivity information may include an identifier such as a MAC address, IP address, or network-specific identifier; the identifier may also include a globally unique identifier (GUID) used to identify a device among a series of devices in a programmable device communication network.

Various data flow operations are also depicted in the architecture of FIG. 1. These include the query data 110 (in the form of a resource locator string) being provided to the smartphone 120 (for example, as input by a user or provided by a program operating on the smartphone 120). Access control data operations include a request 111 to the access control system 130 to authenticate access to a specific device resource; and a response 112 from the access control system 130 indicating granted (or denied) access. The access control system 130 may further provide an authentication token or authentication information for further communications with certain devices and systems.

Positioning data operations include request 113 being provided to the positioning system 140, and response 114 being received from the positioning system 140. Alternately, a positioning system such as GPS or a three-dimensional building positioning system may not transmit a request to the positioning system, but may instead automatically transmit a response 114 (such as triangulation data) containing data for the smartphone 120 to determine its own location.

Device data operations include request 115 being provided to the device domain database 150 (or like system providing such a database or data store), and a response 116 being provided to the smartphone 120 containing necessary data to identify one or more devices (or alternately, an indication of no matching devices). For example, the request 115 provided to device domain database 150 may include a request of a specific device type, domain, location identifier, device identifier, and device connection information.

Finally, upon identification of the device (such as nearby television 160), the smartphone 120 can communicate with the device. For example, a command 117 may be transmitted to the nearby television 160 to power down, change the channel, change the volume, and the like.

The operations described above and illustrated in FIG. 1 as being performed at the smartphone 120 for identifying and filtering the list of devices may be performed in whole or in part by a remote service or system, for example, in a system providing the device domain database 150. Thus, processing logic for determining the one or more devices that match the location-specific resource identifier query may be performed in any combination of a mobile device or a remote service.

As a further example, various system architectures may be configured to support use of a location-specific resource locator for devices and subsystems in a building (e.g., a home, office, indoor public area) or other defined environment. While location may be effectively derived by GPS at the macro level for outdoor spaces, in many indoor applications a micro-level location, such as at room-level or building level, is needed. GPS may not be ideal for such indoor use, because GPS satellite signals do not permeate many buildings, and GPS coordinates may not be fine enough or accurate enough to distinguish between rooms or devices inside a building.

In one embodiment, the presently described location-aware resource locator may be used in conjunction with a positioning system specifically designed to identify locations within the interior space of a building. This positioning system is provided in the following example with the name of "Building Positioning System".

In an example Building Positioning System, devices may be used to transmit a signal over Bluetooth or a baseband standard (ideally using signals that permeate walls). A mobile device such as a smartphone may be used to detect the relevant signals, and compute the location of the devices relative to the mobile device when operating at some fixed or central point in the building (e.g., the corner of a room). The location of the devices relative to some centralized, fixed device may also be determined. The fixed location of the devices within the building, when determined, may be provided to a data store such as the previously described device domain database.

A logical location term may be defined to refer to three-dimensional Cartesian coordinates of a fixed position. For example, an absolute location of a device in a building may be (1.2, 4.3, −3.9), with each number representing meters or another measurement relative to some central point, whereas the logical location may be "downstairs bedroom". This coordinate location may be associated with one or more logical location terms for use in the location-aware resource identifier. The various mappings between the absolute location and logical location may be created when a building is surveyed (for example, when establishing the device network or installing additional devices), or may occur at a later time when adding or modifying logical definitions within the network.

As a usage example of resource locators in a building environment, a user may desire to access the device located closest to him or her for some particular usage (for example, to turn on the nearest light, or turn up the temperature at the nearest thermostat). Other examples include control of an automated window shade in a particular bedroom, or access to a video stream from a video camera located at a front door. Accessing and identifying these devices of interest with a resource locator may involve the use of proximity-based criterion terms (e.g., "near"), logical location terms (e.g., "bedroom" or "front.door"), or a combination thereof.

A location mapping for devices in a building or other defined environment may be provided in a device information database such as device domain database 150. The device mapping stored in the device information database may be accessed in a variety of use cases related to absolute or relative location. For example, when locating the audio-visual electronic device nearest to a user, a proximity-based location may be determined and used. For use cases such as checking the front door camera remotely, a device's logical location may be determined and used.

When a user intends to locate and access a proximity-based location, such as the "nearest" device to some dynamic location, the location of the user or the originating request is determined for comparison. The absolute location of the user may be obtained from the positioning system (such as a building positioning system) or from the device itself. The absolute location of the user is compared to either or both of the absolute location (e.g., Cartesian coordinates) or logical location (e.g., the room associated with the device) for the device, to determine the value of the proximity class.

In a resource locator used to conduct a proximity-based location lookup (e.g., http://near/thermostat), the domain name of the building may be omitted from the resource identifier, because the device attempts to exclusively communicate with all devices in the local domain. A hierarchy of mappings from domains (e.g., a house) and sub-domain (e.g., a room) to absolute locations, accompanied by a mapping of a device to an absolute location, may be used, however, to fully resolve a combination of proximity and logical terms in a resource locator. This can be implemented in a relational database or store of key-value pairs (for example, such as provided in the device domain database).

In some embodiments, a device information database may reside in the cloud and be managed by an infrastructure as a service (IaaS, also known as "cloud infrastructure") provider, or it may be served locally by an in house server. A standard protocol language or communication scheme may be implemented such that client interface devices (e.g., various types of smartphones) can be programmed against this language or communication scheme.

A logical location may be further defined within a hierarchy or otherwise associated with hierarchical location information. For example, the location "bedroom" may be established within the location of "second floor". In some embodiments, a hierarchy of devices may be defined within the device information database and used to tie a device or set of devices to one or more logical, hierarchical locations.

A definition of hierarchical device classes allows the expression of relationships between devices or location-based characteristics, and the assignment of a device to a subclass or superclass that may satisfy some criterion. This can be used to simplify the use of proximity-based lookups of devices. For example, a user may want to access any nearby audio-visual device in any room on a particular floor; in such a case the logical, hierarchical location for either the room or the floor can be queried to allow the user to determine that there is both a TV as well as an internet radio in a particular room.

A hierarchical definition of device locations for devices in an example building may be stored or otherwise provided in any number of formats and data sources. An illustrative hierarchical definition of devices in a home, as implemented in an XML format, may be structured according to the following example:

```
<home name="smiths">
    <room name="bedroom">
        <corner (3,4,5)/>
        <corner (7,6,8)/>
        <devices>
            <thermostat id= /*Some GUID*/ />
            <TV id = /*Some GUID*/ />
        </devices>
    </room>
    <devices>
        <TV location="bedroom">
    </devices>
    <TV id=/*Some GUID*/ >
        <location = (4,5,7)>
    </TV>
    ...
    <hierarchies>
        <upstairs>
            <room=bedroom/>
            ...
```

```
        </upstairs>
        <downstairs>
            <room=bedroom/>
            ...
        </downstairs>
    </hierarchies>
</home>
```

Based on the defined hierarchy in the example XML listing above, an unambiguous location-based resource locator, that includes reference to the domain, may be provided from:
http://smiths.home/bedroom/TV A location-based resource locator specifying a single resource by proximity to a dynamic location, may be provided from:
http://near/thermostat A location-based resource locator specifying a potential group of resources by proximity to a dynamic location, may be provided from:
http://current.room/audio A location-based resource locator specifying a potential group of resources from a defined location, may be provided from:
http://smiths.home/rear/all_cameras The syntax of location and proximity terms in resource locators may be used to map to the various nodes (groupings) of the hierarchy. It will be apparent that a hierarchical representation is not required to be implemented with an XML listing or schema, but rather the hierarchical representation may also be provided in a relational database, or variety of other data sources (such as device domain database 150).

Figure 2:
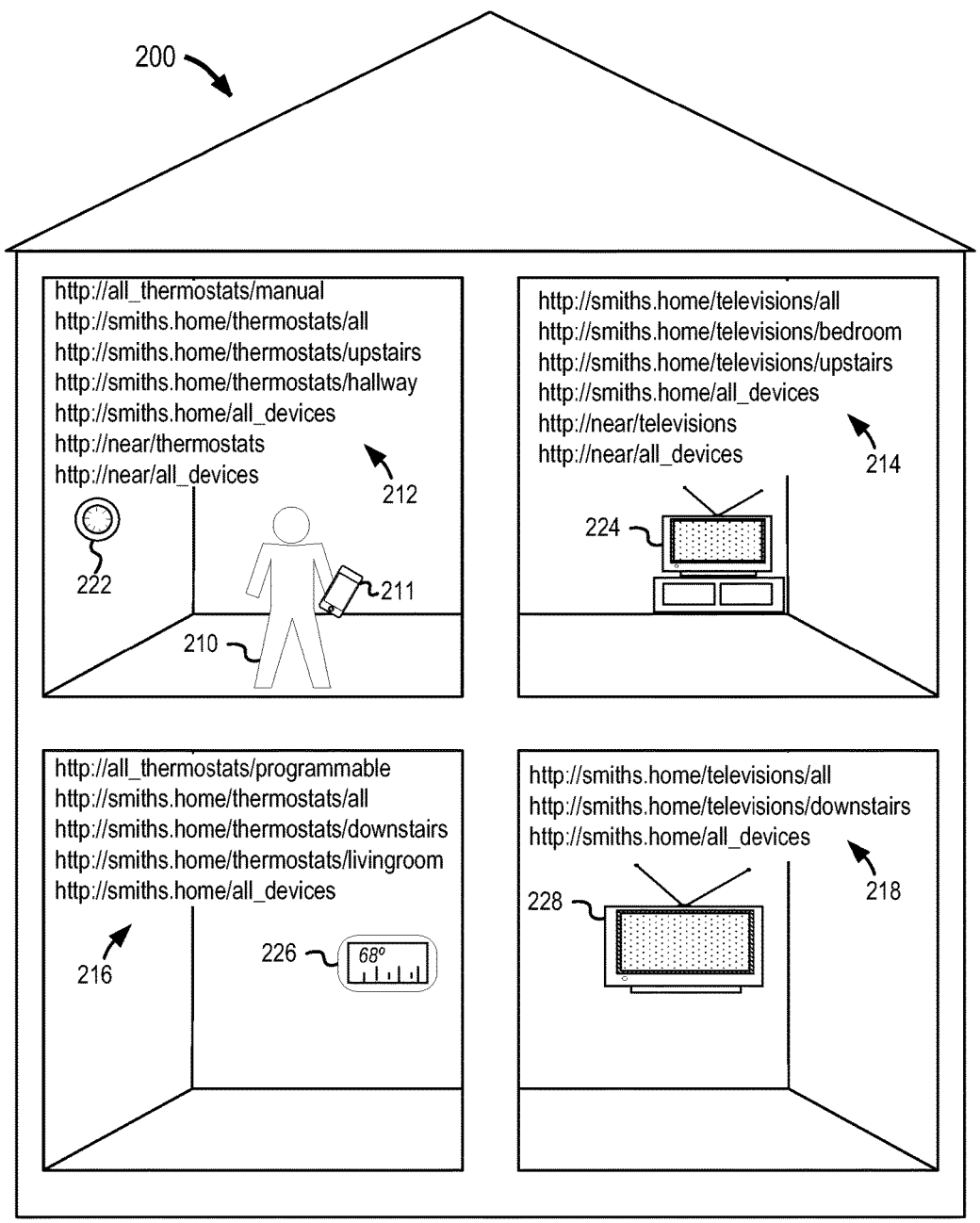
FIG. 2 provides an illustration of a deployment of a location-aware resource locator for a plurality of electronic devices in a residential setting according to an example embodiment.

FIG. 2 provides a detailed illustration for a deployment of location-specific resource locators in a home environment 200 according to one example embodiment, with multiple examples of domain-based resource locators and proximity-based resource locators illustrated therein.

For example, in the upper level of the home environment 200, a human user 210 is operating a mobile device 211 and is located proximate to thermostat 222. The mobile device 211 may access the thermostat 222 through use of any of the resource locators 212 (for example, accessed through device domain locator all_thermostats at http://all_thermostats/manual; through domain locator smiths.home with a logical locator http://smiths.home/thermostats/upstairs; and through proximity-based resource locators http://near/thermostats, producing a list of thermostats).

Control of television 224 may be performed through the use of resource locators 214 (including proximity-based locators http://near/televisions); control of thermostat 226 located on another building level may be performed through the use of resource locators 216; and control of television 228 located on another building level may be performed through use of resource locators 218.

A user may not wish to type in or specify the syntax of location-specific resource locators directly, so a variety of interfaces may be used to resolve to the resource locators. Further, various graphical user interfaces (GUIs) may be written as standalone or extension applications to make the resource locators accessible. Additionally, use of the resource locators and resource locator data may be integrated into other applications. Three-dimensional maps can be generated or augmented based on the logical hierarchical location data, for example, to provide a visualization of interactive devices within a building or other environment.

In further embodiments, additional security features may be implemented in connection with access and control functionality. Additionally, at multiple levels of the system, access may be granted or denied to a specific device class, device, or feature. For example, when going to another person's house or building, the owner/administrator may want to grant another user access to some or all devices in order to control them. Once this access is granted, resource locator queries in the local domain may be used to see the subset of devices that are available.

In the context of device control, the access control system may be structured to specifically give friends, relatives, employees, or certain others the access needed to access devices with certain addresses in multiple domains. Having a closed access system may preclude the need to firewall the device communication system or operate the device communication system without external network connectivity. For example, one secure mode of operation may include keeping a domain and domain addresses invisible to a user, unless that user has a basic level of query capability with the access control system.

Multiple levels of access may also be defined that loosely correspond to "read only" and "read write" for each device or sub-domain. A foundation of trust for both the resource locator host as well as the smartphone device may be used. For example, a means of attestation may be used to guarantee that a mobile phone user is authentic. A variety of existing security and access-related techniques may be incorporated in connection with such authentication and attestation techniques.

Figure 3:
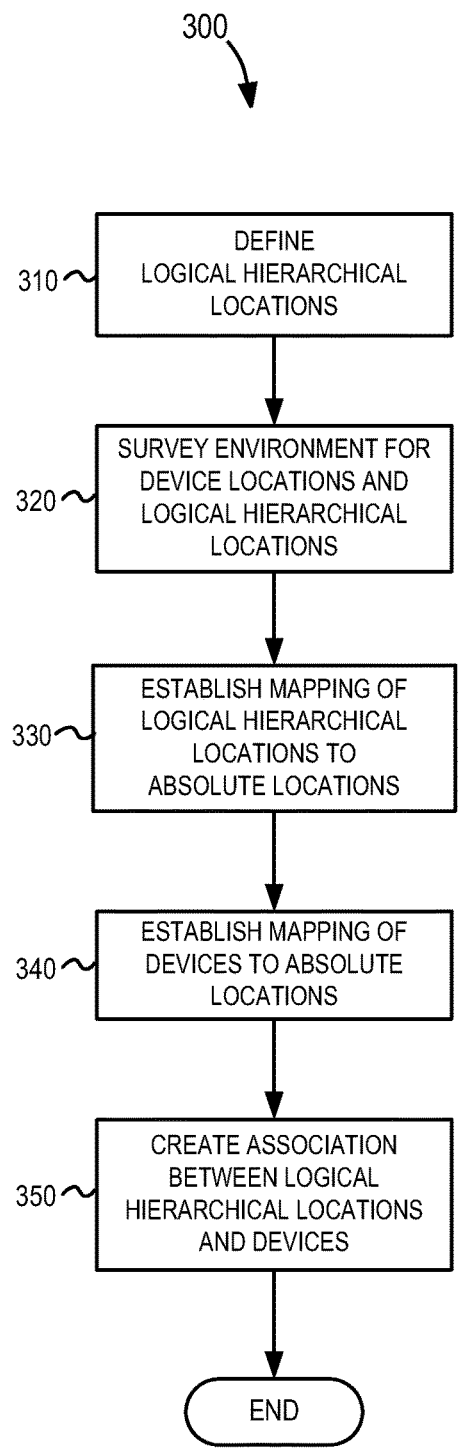
FIG. 3 provides a flowchart illustrating a method for establishing resource information to support a plurality of location-specific resource locators for electronic devices according to an example embodiment.

FIG. 3 provides an illustration of a process 300 for establishing resource information for use with a plurality of location-specific resource locators according to an example embodiment. The following example process 300, in particular, may be used to establish information supporting the resolution of location-related terms used in a resource locator address.

As illustrated in operation 310, logical names for logical hierarchical locations are defined for devices, building locations, and other areas relevant to a location-specific resource locator. This may include the creation of a hierarchy relevant to a building, the associated rooms in a building, the physically located devices in each room, and appropriate names for such nodes in the hierarchy. Further granularity in building spaces might be used in place of room-levels, for example, with cubicles in an open building space.

Next, in operation 320, the environment is surveyed for device locations and logical hierarchical locations. This survey may be performed with a single or multiple operations. The survey may also be initiated in response to a new or changed configuration, for example, when adding new devices to a device network. The survey may be used to obtain coordinate values for absolute location of the devices (e.g., a relevant point where an electronic device is located within a building) and the logical hierarchical locations (e.g., a set of relevant points defining the dimensions of a room within a building).

In operation 330, the absolute location values are mapped to relevant logical hierarchical locations. In operation 340, the absolute location values are mapped to relevant devices. Either of these operations 330 and 340 may include user review and modification to verify that the logical names and devices correctly map to determined location coordinate values.

Finally, in operation 350, an association between the logical hierarchical locations and the devices contained therein is established. This may be performed manually by the user, or by an automated process based on the coordinate values. An automated process may determine by implication, for example, that a device located within the perimeter of certain room coordinates is also located within the room. The association may be stored within a dedicated scheme or data store, for example, in the previously described device information database.

Figure 4:
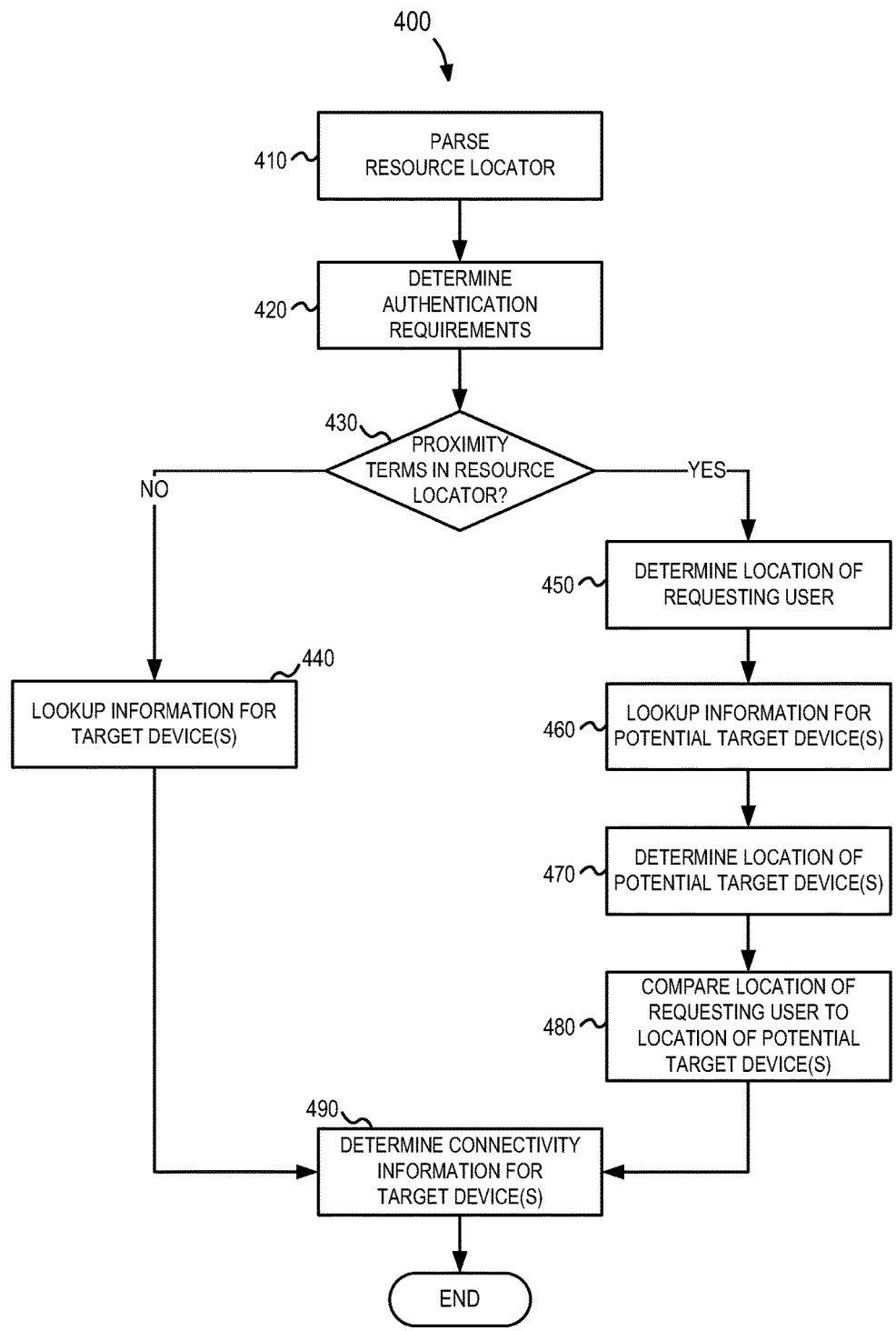
FIG. 4 provides a flowchart illustrating a method for accessing an electronic device with use of a location-specific resource locator according to an example embodiment.

FIG. 4 provides an illustration of a process 400 for utilizing a location-specific resource locator according to an example embodiment. In operation 410, the location-specific resource locator is parsed. This may include determining domain, proximity terms, and properties from keywords or other terms in the resource locator string. Additionally, certain terms and keywords may be defined or reserved for use in the resource locator to refer to certain actions or locations.

In operation 420, authentication requirements for use of the resource locator and any corresponding communications are determined. For example, the resource locator may be provided to an access control system to determine if the user has access to the resource(s) or resource type(s) specified in the resource locator. In response, authentication information may be verified (or denied) for further communications.

In decision 430, an evaluation of whether proximity terms are included in the resource locator is performed. If proximity terms are not included in the resource locator, then a simple lookup for information of one or more target devices may be performed in operation 440. The operation 440 may include performing an inquiry to a device information database to determine if any devices match the terms in the resource locator.

If as a result of decision 430, proximity terms are included in the resource locator, then the resource locator is evaluated for proximity to the user. In operation 450, the location of the requesting user (typically a dynamic, non-fixed location) is determined. This may include, for example, the location of the requesting user's mobile device, or another dynamic point associated with the user.

The location of the requesting user will be compared to a group of one or more potential target devices, based on the proximity class specified in the resource locator, and the known information about the potential target devices. In operation 460, information for potential target devices is collected. The operation 460 may include performing an inquiry to a device information database to determine if any devices match the location-related (e.g., "near" a certain room) or device-related (e.g., a "thermostat" device type) terms in the resource locator.

In operation 470, location information (such as coordinates) obtained from the device information database is then derived to determine the locations of the potential target devices. In operation 480, the location of the requesting user is compared to the location of the potential target devices. Through this comparison, the list of potential target devices can then be narrowed down to a list of target devices that matches the proximity terms in the resource locator.

As a result of either operation 440 or operation 480, the identity and associated information for the one or more target devices is made available. In operation 490, the connectivity information for network communications with the one or more target devices may be further determined Subsequent operations may include use of the connectivity information, and the transmission of communications between the one or more target devices (not shown).

The presently described resource locator techniques and configurations may be used in combination with a variety of other standards and configurations. One such standard which may be used in combination with a location-aware resource locator is Internet Engineering Task Force (IETF) RFC 5985, HTTP-Enabled Location Delivery (HELD), providing network-based techniques for determining geo-location of devices.

Although numerous of the previous examples were provided with reference to absolute locations of fixed devices, the location-specific resource locator model may be used for communication with any number or configuration type of mobile and non-fixed devices generally. This may include mobile devices, for example, associated with a particular room or building space.

Other applicable network configurations may be included within the scope of the presently described networks. Although the examples of resource locators were provided with reference to use of a HTTP uniform resource identifier, it will be apparent that many other uniform resource identifiers and application-layer protocols may be used in connection with the presently described resource locator model.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the base station or the UE may include one or more processors and may be configured with instructions stored on a computer-readable storage device.

Figure 5:
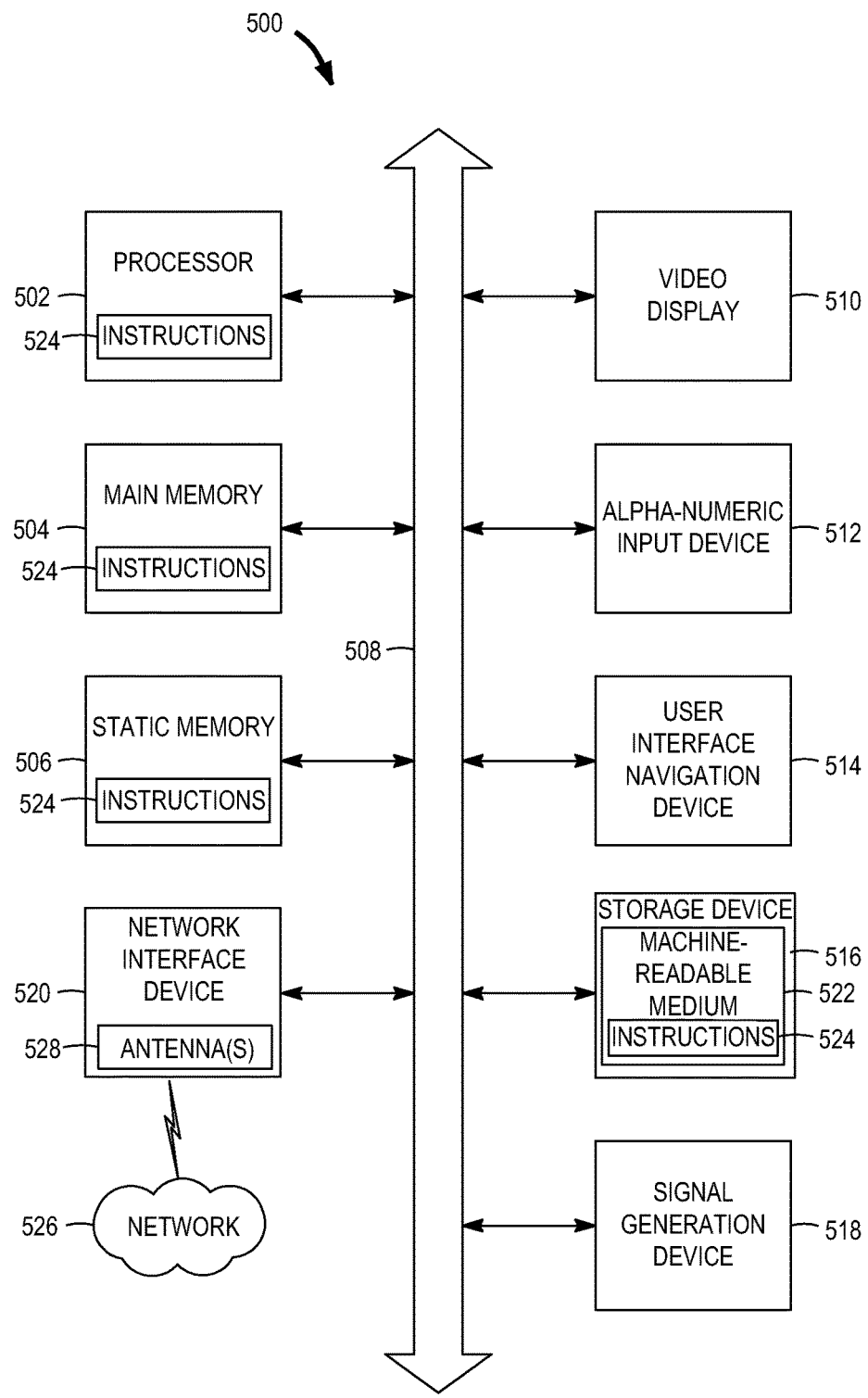
FIG. 5 provides a block diagram illustrating an example machine upon which one or more embodiments can be implemented.

FIG. 5 is a block diagram illustrating an example machine upon which any one or more of the methodologies herein discussed can be run. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes a processor 502 (e.g., a central processing unit (CPU), a graphics processing unit (GPU) or both), a main memory 504 and a static memory 506, which communicate with each other via a bus 508. The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system 500 can additionally include a storage device 516 (e.g., a drive unit), a signal generation device 518 (e.g., a speaker), a network interface device 520 (which may include or operably communicate with one or more antennas 528, transceivers, or other wireless communications hardware), and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes a computing device, comprising: at least one processor; and at least one memory device having a plurality of instructions stored therein, that when executed by the processor, cause the processor to perform operations that: interpret a resource locator used to communicate with one or more devices among a network of devices, the resource locator providing one or more location-based terms; access device information from a device information database using the location-based terms; and identify the one or more devices in the network of devices using the device information.

In Example 2, the subject matter of Example 1 can optionally include the location-based terms including one or more proximity criterion terms for identifying the one or more devices in the network of devices based on proximity to a dynamic location.

In Example 3, the subject matter of one or any combination of Examples 1-2 can optionally include the computing device being a smartphone configured to communicate with the one or more devices in the network of devices using a wireless network connection.

In Example 4, the subject matter of one or any combination of Examples 1-3 can optionally include determining location for the one or more devices; and associating the location for the one or more devices with one or more location-based identifiers in the device information database.

In Example 5, the subject matter of one or any combination of Examples 1-4 can optionally include establishing communication with the identified one or more devices using the device information.

Example 6 can include, or can optionally be combined with the subject matter of one or any combination of Examples 1-5 to include a method, comprising: determining, with an electronic system, a physical location in a defined environment for a particular device, the particular device connected to a network of devices; associating, in a data store, the physical location of the particular device with one or more location-based identifiers; receiving and interpreting a resource locator, the resource locator providing one or more terms correlated to at least one of the one or more location-based identifiers; and identifying the particular device in the network of devices using the location-based identifiers.

In Example 7, the subject matter of Example 6 can optionally include determining proximity of devices in the network of devices relative to a dynamic location in the defined environment; wherein the resource locator provides one or more proximity-based terms to indicate a criterion for identifying the one or more devices by proximity to the dynamic location; and wherein identifying the one or more devices in the network of devices includes identifying the one or more devices including the particular device based on the proximity to the dynamic location.

In Example 8, the subject matter of one or any combination of Examples 6-7 can optionally include determining a physical location in the defined environment of an originator of the resource locator; wherein the dynamic location comprises the physical location of the originator of the resource locator.

In Example 9, the subject matter of one or any combination of Examples 6-8 can optionally include the originator of the resource locator comprising a mobile device operated by a user, wherein the dynamic location comprises a location of the mobile device operated by the user.

In Example 10, the subject matter of one or any combination of Examples 6-9 can optionally include generating a listing of one or more devices associated with the resource locator using the location-based identifiers, the listing of the one or more devices including the identification of the particular device.

In Example 11, the subject matter of one or any combination of Examples 6-10 can optionally include determining the physical location in the defined environment of the particular device including determining a physical location of the particular device in a three-dimensional space of a building.

In Example 12, the subject matter of one or any combination of Examples 6-11 can optionally include location-based identifiers being logical terms defining spaces or objects within the three-dimensional space of the building.

In Example 13, the subject matter of one or any combination of Examples 6-12 can optionally include associating the physical location of the device including storing data representing the physical location of the device in a device information database.

In Example 14, the subject matter of one or any combination of Examples 6-13 can optionally include the resource locator being correlated to at least one of the one or more location-based identifiers in a location-based hierarchy, the location-based hierarchy providing a mapping of locations in the defined environment.

Example 15 can include, or can optionally be combined with the subject matter of one or any combination of Examples 1-14 to include a computer-readable storage medium having computer-readable instructions, which when executed by the computer, cause the computer to: interpret a resource locator string, the resource locator string providing one or more terms associated with location-based information maintained for one or more devices in a network of devices; and identify the one or more devices among devices within the network of devices based on the association between the location-based information and the one or more terms.

In Example 16, the subject matter of Example 15 can optionally include determining location criterion of proximity-based terms provided by the one or more terms, the location criterion evaluated relative to a dynamic location and used to identify the one or more devices in the network of devices satisfying the location criterion.

In Example 17, the subject matter of one or any combination of Examples 15-16 can optionally include the dynamic location comprising a location of an originator of the resource locator string.

In Example 18, the subject matter of one or any combination of Examples 15-17 can optionally include the resource locator string being provided from a mobile device operated by a user, and wherein the dynamic location comprises a location of the mobile device operated by the user.

In Example 19, the subject matter of one or any combination of Examples 15-18 can optionally include the location-based information comprising logical terms associated with coordinates in a three-dimensional space of a building.

In Example 20, the subject matter of one or any combination of Examples 15-19 can optionally include the terms being associated with the location-based information in a location-based hierarchy of a defined environment for the one or more devices, the location-based hierarchy used to identify the one or more devices in the network of devices.

Example 21 can include, or can optionally be combined with the subject matter of one or any combination of Examples 1-20 to include a system, comprising: a device information database providing location information for a plurality of devices in a network; and a device configured for communication with one or more particular devices of the plurality of devices using a location-specific resource locator; wherein the location-specific resource locator is interpreted to resolve location terms included in the location-specific resource locator to the location information provided for the one or more particular devices.

In Example 22, the subject matter of Example 21 can optionally include a positioning system providing location information for a mobile device operated in a defined environment; wherein the location-specific resource locator is further interpreted to resolve proximity criterion provided in the location terms relative to the location information for the mobile device, to identify the one or more particular devices based on the proximity to the mobile device.

In Example 23, the subject matter of one or any combination of Examples 21-22 can optionally include the device being a mobile wireless device, the mobile wireless device providing one or more applications for providing the location-specific resource locator.

In Example 24, the subject matter of one or any combination of Examples 21-23 can optionally include location information provided from the device information database being used to produce a list of the one or more particular devices provided for the location-specific resource locator.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computing device, comprising:
   at least one processor; and
   at least one memory coupled to the at least one processor and storing instructions that, when executed by the at least one processor, cause the at least one processor to perform operations that:
   determine, based on location coordinates received from a positioning system, a respective physical location for each of a respective one or more devices in a network of devices;
   associate the respective physical locations for the one or more devices with a respective one or more location-based identifiers in a device information database in communication with the computing device;
   interpret a resource locator used to communicate with the one or more devices, the resource locator providing one or more location-based terms, wherein the resource locator comprises an extended Uniform Resource Locator syntax and includes:
      a respective domain identifier associated with the respective physical location for each of the respective one or more devices; and
      a respective proximity criterion term for identifying each of the respective one or more devices based on a predetermined distance to the respective physical location of the respective one or more devices;
   access device information from the device information database using the location-based terms; and
   identify the one or more devices in the network of devices using the device information.

2. The computing device of claim 1, wherein the location-based terms include one or more proximity criterion terms for identifying the one or more devices in the network of devices based on proximity to a dynamic location.

3. The computing device of claim 1, wherein the computing device is a smartphone configured to communicate with the one or more devices in the network of devices using a wireless network connection.

4. The computing device of claim 1, the plurality of instructions further causing the at least one processor to perform operations that:
   establish communication with the identified one or more devices using the device information.

5. A method, comprising:
   determining, by a computing device based on location coordinates received from a positioning system, a physical location in a defined environment for a particular device, the particular device connected to a network of devices;
   associating, in a data store, the physical location of the particular device with one or more location-based identifiers;
   receiving and interpreting a resource locator, the resource locator providing one or more terms correlated to at least one of the one or more location-based identifiers, wherein the resource locator comprises an extended Uniform Resource Locator syntax and includes:
      a respective domain identifier associated with the respective physical location for each of the respective one or more devices; and
      a respective proximity criterion term for identifying each of the respective one or more devices based on a predetermined distance to the respective physical location of the respective one or more devices; and
   identifying the particular device in the network of devices using the location-based identifiers.

6. The method of claim 5, further comprising:
   determining proximity of devices in the network of devices relative to a dynamic location in the defined environment;
   wherein the resource locator provides one or more proximity-based terms to indicate a criterion for identifying the one or more devices by proximity to the dynamic location; and
   wherein identifying the particular device in the network of devices includes identifying the one or more devices including the particular device based on the proximity to the dynamic location.

7. The method of claim 6, further comprising:
   determining a physical location in the defined environment of an originator of the resource locator;
   wherein the dynamic location comprises the physical location of the originator of the resource locator.

8. The method of claim 7, wherein the originator of the resource locator comprises a mobile device operated by a user, and wherein the dynamic location comprises a location of the mobile device operated by the user.

9. The method of claim 5, further comprising generating a listing of one or more devices associated with the resource locator using the location-based identifiers, the listing of the one or more devices including the identification of the particular device.

10. The method of claim 5, wherein determining the physical location in the defined environment of the particular device includes determining a physical location of the particular device in a three-dimensional space of a building.

11. The method of claim 10, wherein the location-based identifiers are logical terms defining spaces or objects within the three-dimensional space of the building.

12. The method of claim 5, wherein associating the physical location of the particular device includes storing data representing the physical location of the particular device in a device information database.

13. The method of claim 5, wherein the resource locator is correlated to at least one of the one or more location-based identifiers in a location-based hierarchy, the location-based hierarchy providing a mapping of locations in the defined environment.

14. A non-transitory computer-readable storage medium having computer-readable instructions, which when executed by a computing device, cause the computing device to:
   determine, based on location coordinates received from a positioning system, a respective physical location for each of a respective one or more devices in a network of devices;
   associate the respective physical locations for the one or more devices with a respective one or more location-based identifiers in the device information database;
   interpret a resource locator string, the resource locator string providing one or more terms associated with location-based information maintained for the one or more devices, wherein the resource locator string comprises an extended Uniform Resource Locator syntax and includes:
      a respective domain identifier associated with the respective physical location for each of the respective one or more devices; and
      a respective proximity criterion term for identifying each of the respective one or more devices based on a predetermined distance to the respective physical location of the respective one or more devices; and
   identify the one or more devices among devices within the network of devices based on the association between the location-based information and the one or more terms.

15. The computer-readable storage medium of claim 14, wherein the medium further stores instructions for causing the computing device to:
   determine location criterion of proximity-based terms provided by the one or more terms, the location criterion evaluated relative to a dynamic location and used to identify the one or more devices in the network of devices satisfying the location criterion.

16. The computer-readable storage medium of claim 15, wherein the dynamic location comprises a location of an originator of the resource locator string.

17. The computer-readable storage medium of claim 15, wherein the resource locator string is provided from a mobile device operated by a user, and wherein the dynamic location comprises a location of the mobile device operated by the user.

18. The computer-readable storage medium of claim 14, wherein the location-based information comprises logical terms associated with coordinates in a three-dimensional space of a building.

19. The computer-readable storage medium of claim 14, wherein the terms are associated with the location-based information in a location-based hierarchy of a defined environment for the one or more devices, the location-based hierarchy used to identify the one or more devices in the network of devices.

20. A system, comprising:
   a positioning system providing location information for a plurality of devices in a network;
   a device information database for storing the location information for the plurality of devices; and
   a computing device in communication with the device information database and the positioning system and adapted to:

determine, based on location coordinates received from the positioning system, a respective physical location for each of one or more particular devices from the plurality of devices;

interpret a location-specific resource locator to resolve location terms included in the location-specific resource locator to the location information provided for the one or more particular devices, wherein the resource locator comprises an extended Uniform Resource Locator syntax and includes:
- a respective domain identifier associated with the respective physical location for each of the respective one or more devices; and
- a respective proximity criterion term for identifying each of the respective one or more devices based on a predetermined distance to the respective physical location of the respective one or more devices; and communicate with the one or more particular devices of the plurality of devices using the location-specific resource locator.

21. The system of claim 20,
wherein the positioning system provides location information for a mobile computing device operated in a defined environment, and
wherein the location-specific resource locator is further interpreted to resolve proximity criterion provided in the location terms relative to the location information for the mobile computing device to identify the one or more particular devices based on the proximity to the mobile device.

22. The system of claim 20, wherein the one or more particular devices includes a mobile wireless device, the mobile wireless device providing one or more applications for providing the location-specific resource locator.

23. The system of claim 20, wherein the computing device is further adapted to generate a list of the one or more particular devices provided for the location-specific resource locator based on location information from the device information database.

* * * * *